United States Patent [19]

Antkowiak

[11] Patent Number: 4,867,043
[45] Date of Patent: Sep. 19, 1989

[54] END CAP FOR FLUID CYLINDER

[75] Inventor: Robert G. Antkowiak, Pendleton, N.Y.

[73] Assignee: Tayco Developments, Inc., North Tonawanda, N.Y.

[21] Appl. No.: 880,595

[22] Filed: Jun. 30, 1986

[51] Int. Cl.⁴ .................... F16J 15/02; F16J 15/32
[52] U.S. Cl. ................. 92/165 R; 92/170.1; 277/205; 277/212 C; 277/212 F
[58] Field of Search ............ 92/165 R, 168, 169, 92/170; 277/205, 207 R, 208, 209, 212 R, 212 C, 212 F; 220/307, 308

[56] References Cited

U.S. PATENT DOCUMENTS

| 2,657,817 | 11/1953 | Alvear | 220/307 X |
| 2,815,995 | 12/1957 | Young | 277/205 |
| 3,071,800 | 1/1963 | Patriquin | 92/165 R X |
| 3,179,054 | 4/1965 | Arndt et al. | 92/128 X |
| 3,388,638 | 6/1968 | Brinkel | 277/205 X |
| 3,578,027 | 5/1971 | Zopfi | 277/208 X |
| 3,861,691 | 1/1975 | Wheeler | 277/205 |
| 4,182,475 | 1/1980 | Freund | 220/307 X |
| 4,189,160 | 2/1980 | Hasegawa et al. | 277/205 |
| 4,426,014 | 1/1984 | Coltman, Jr. | 220/307 |
| 4,519,616 | 5/1985 | Johnston | 277/205 X |
| 4,531,452 | 7/1985 | Spielmann et al. | 92/170 X |
| 4,532,856 | 8/1985 | Taylor | 92/170 X |

Primary Examiner—Robert E. Garrett
Assistant Examiner—Mark A. Williamson
Attorney, Agent, or Firm—Joseph P. Gastel

[57] ABSTRACT

An end cap for a fluid cylinder having a central body portion and opposite end portions, flexible annular lips on the opposite end portions, an annular barb on one of the end portions for mating engagement with a groove with a cylinder for retaining the end cap in position, and an enlarged protuberance on the other annular portion of a diameter greater than the internal diameter of the cylinder for providing an interference fit therewith.

20 Claims, 2 Drawing Sheets

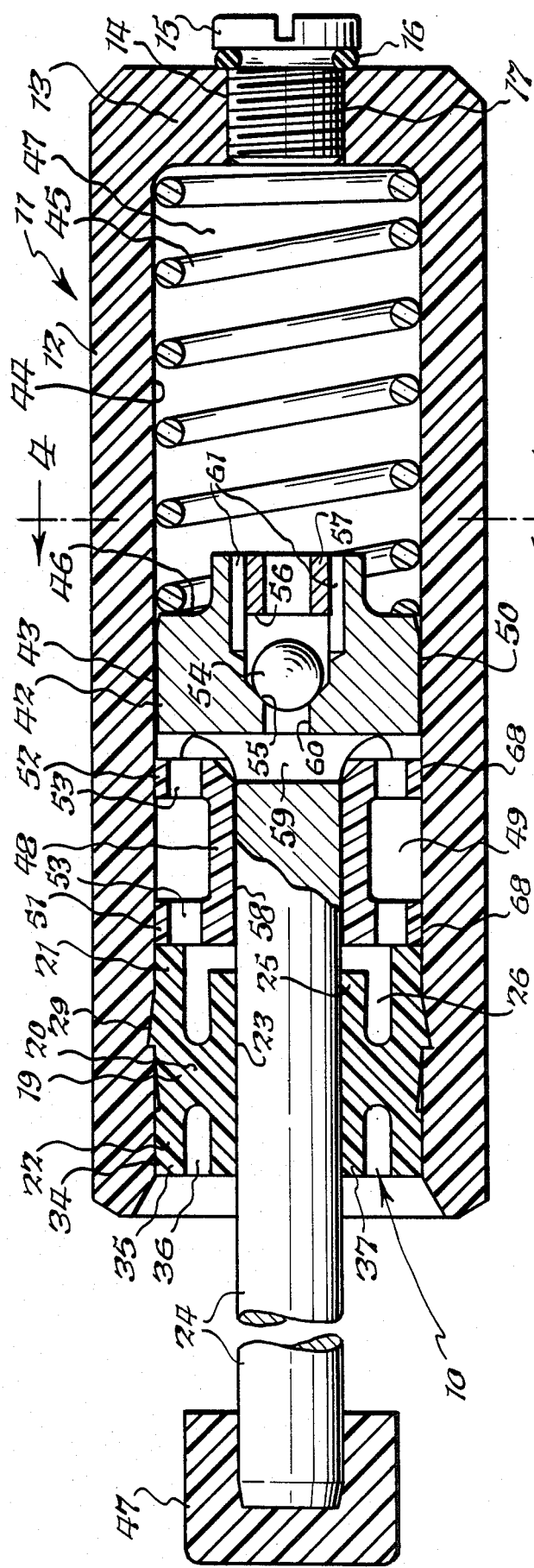
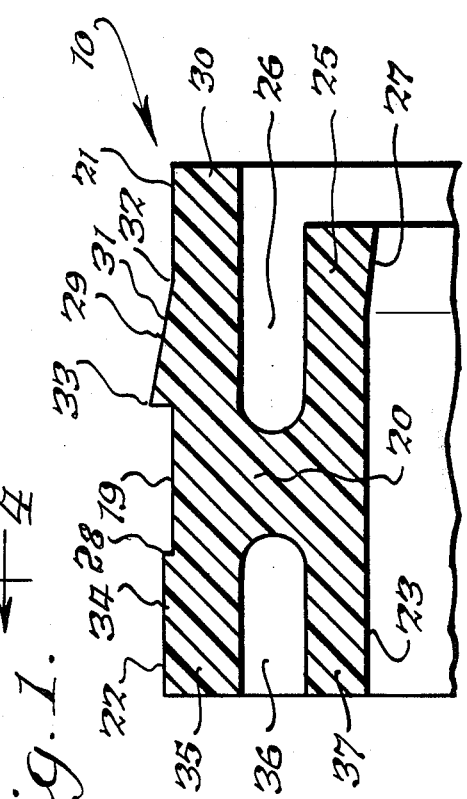

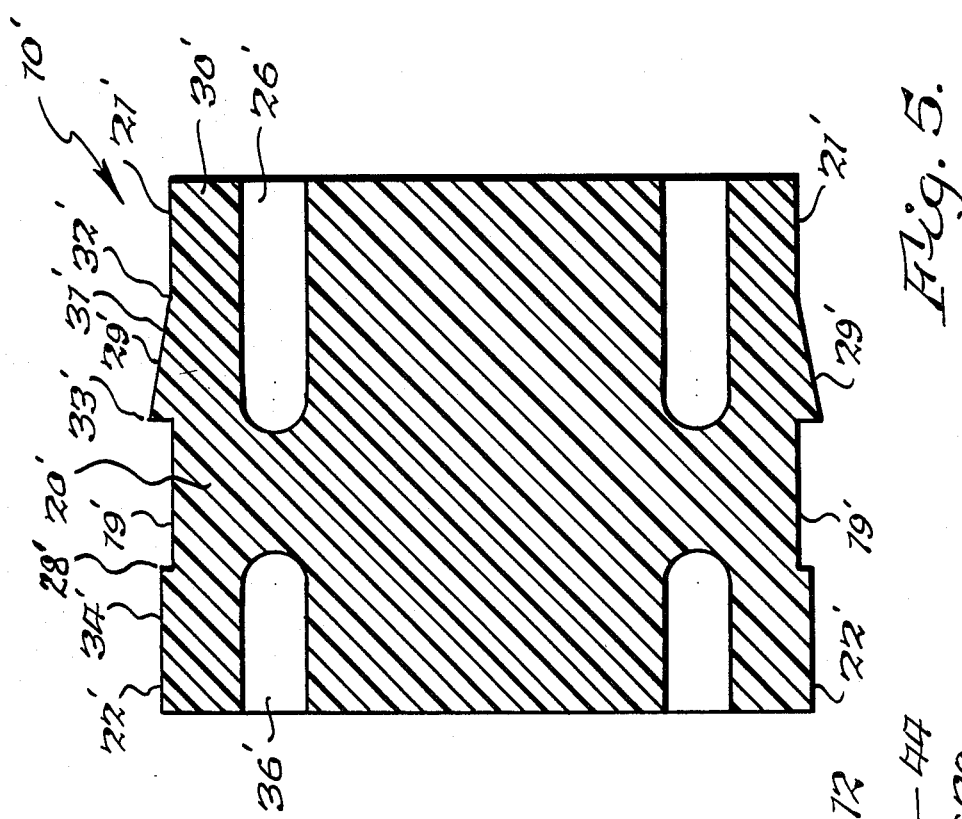
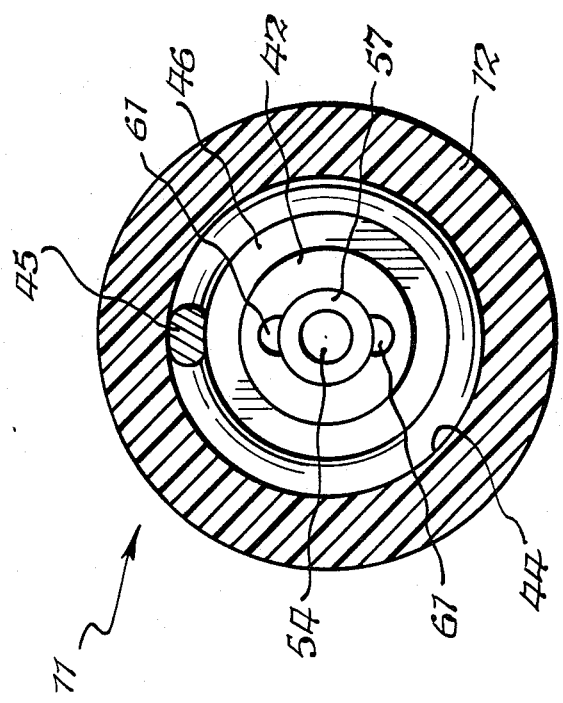
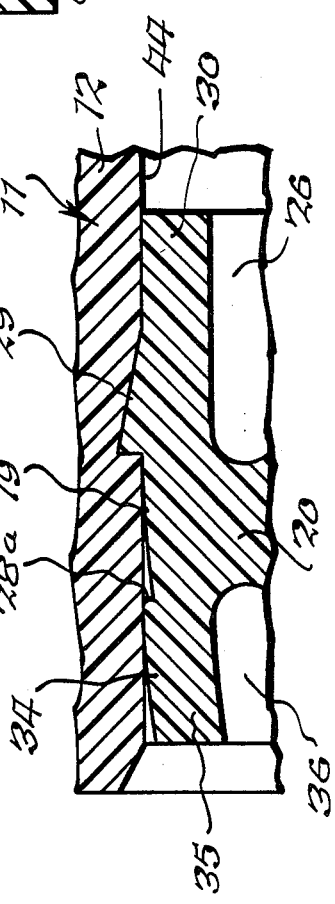

END CAP FOR FLUID CYLINDER

BACKGROUND OF THE INVENTION

The present invention relates to an improved end cap for a cylinder of the type used in fluid actuators and fluid energy absorber devices, such as shock absorbers and liquid springs.

By way of background, in U.S. Pat. No. 4,532,856 an end cap is disclosed which can be snapped into position in the end of a cylinder. However, this end cap required an O-ring to effect sealing, and this O-ring was retained within a groove in the end cap. When the end caps are extremely small, the depth of groove required for an O-ring is so disproportionately large with respect to the body of the end cap that the body is weakened by the existence of the groove.

SUMMARY OF THE INVENTION

It is the object of the present invention to provide an improved end cap for a cylinder which can be slipped into position and firmly retained therein and which does not require an O-ring for proper sealing. Other objects and attendant advantages of the present invention will readily be perceived hereafter.

The present invention relates to a combined locking and sealing end cap for an associated cylinder comprising a plastic body portion having first and second end portions and a central portion therebetween and outer surfaces on all of said portions, a first annular lip extending outwardly from said central body portion toward said first end, protuberance means on said outer surface of said first annular lip for effecting locking engagement with said associated cylinder, a second annular lip extending outwardly from said central body portion on the opposite side thereof from said first end portion and toward said second end portion, and second protuberance means on said outer surface of said second annular lip for effecting sealing engagement with said associated cylinder.

The various aspects of the present invention will be more fully understood when the following portions of the specification are read in conjunction with the accompanying drawings wherein:

BRIEF DESCRIPTION OF THE DRAWINGS

FIG. 1 is a fragmentary cross sectional view of the improved end cap of the present invention located in a fluid cylinder;

FIG. 2 is a fragmentary enlarged cross sectional view of the end of the cylinder into which the end cap fits;

FIG. 3 is a fragmentary enlarged cross sectional view of the end cap;

FIG. 4 is a fragmentary cross sectional view taken substantially along line 4—4 of FIG. 1;

FIG. 5 is a cross sectional view of a modified form of end cap which does not contain the bore therein for receiving a shaft; and FIG. 6 is an enlarged view which depicts the mode of operation of the sealing structure.

DESCRIPTION OF THE PREFERRED EMBODIMENTS

The improved end cap 10 of the present invention is shown in FIG. 1 in position in a fluid energy absorber device 11 in the nature of a shock absorber. It will be appreciated however that end cap 10 may also be used in fluid actuators and other fluid energy management devices, such as liquid springs, and the fluid utilized may be either a liquid or a gas.

The shock absorber 11 includes a cylinder 12 which in this instance is fabricated from plastic but may be fabricated of high strength composition material or metal. In FIG. 1 cylinder 12 has an integrally molded end 13 which contains a threaded screw 14 having a head 15 which bears on O-ring seal 16 so that there is no leakage when cap 14 is in fully tightened threaded engagement with end wall 13. This threaded engagement is effected between threads 17 on cap 14 and mating threads in end wall 13.

End cap 10 of the present invention is basically a cylindrical disc-like member fabricated from plastic, such as nylon or Delrin, and it includes a body 19 having a central body portion 20, a first end portion 21 on ne side thereof and a second end portion 22 on the opposite side thereof. An outer surface extends across all of the aforementioned portions. A bore 23 extends through body 19 for receiving piston rod 24. An annular lip 25 is formed integrally with central body portion 20. The lip 25 is formed because an annular groove 26 is formed in body 19 and surrounds bore 23. Annular lip 25 is formed with a taper at 27 (FIG. 3) to thereby provide good sealing engagement with piston rod or shaft 24. An annular barb 29 is formed on annular lip 30 of body end portion 21. Annular lip 30 is flexible. Barb 29 includes an outer inclined surface 31 leading from its smaller diameter end 32 to its larger diameter end 33. End portion 22 includes a flexible annular lip 35 on which an annular protuberance 34 is located. Annular lip 35 lies outwardly of annular groove 36 which surrounds annular lip 37. Annular protuberance or ridge 34 is of larger diameter than the diameter of central body portion 20.

Cylinder 12 includes an internal annular groove 39 (FIG. 2) having a cross sectional configuration which is complementary to barb 29. When the end cap is to be installed into cylinder 11, the end portion 21 of cap 10 is inserted into countersunk portion 40 of cylinder 12, and cap 10 is moved axially so that barb 29 rides into cylinder portion 41. The existence of annular space 26 permits annular outer lip portion 30 to flex radially inwardly as barb 26 enters portion 41 of cylinder 12. There is in essence a camming action which produces this effect. When barb 29 reaches alignment with groove 39, it will snap into the position shown in FIG. 1 with a loud noise, thereby providing an indication of proper mating. A good tight connection will thus be made which will prevent end cap 10 from being moved out of cylinder 12.

The complementary mating relationship between barb 29 and groove 39 will provide a certain amount of sealing, but there can be leakage at this joint. The movement of end cap 10 into the position shown in FIG. 1 will in no way harm barb 29 because flexing of annular lip 21 will prevent excess pressures from being applied to the barb during installation. The annular groove 26 serves the dual function of permitting flexing of annular lip 25 to provide a good seal with piston rod 21, and, further, it permits the above-described flexing of annular lip 30 to permit installation of the cap in the above-described manner.

In constructions such as shown in prior U.S. Pat. No. 4,532,856, a sealing O-ring was required to be used with the end cap to prevent leakage between it and the cylinder in which it was located. The present end cap 10 does not require a seal to be used therewith. This is because an annular protuberance 34 is located on annular lip 35, and it is of a larger diameter than both the diameter of central body portion 20, which provides a close fit with surface portion 41 of internal cylinder surface 44, and it is also of larger diameter than surface portion 41 of internal cylinder surface 44 so as to provide an interference fit therewith. This interference fit is permitted because annular lip 35 is flexibly attached to central body portion 20 and the inherent resilience of this mounting will provide a good tight fit between protuberance 34 and surface 41 so that a sealing ring is not required. As noted above, this type of end cap is especially useful in cylinders of extremely small size for which it is difficult, if not impossible, to obtain O-rings. In this respect, the end cap 10 may be of so small a diameter that if a groove were placed therein to receive an O-ring, the groove would occupy so great a depth as to weaken the end cap. It will be appreciated however that the present end cap is not limited to use with extremely small cylinders.

The theory of operation of the sealing protuberance 34 can be seen from a comparison of FIGS. 3 and 6. In this respect, the annular edge 28 (FIG. 3) of protuberance 34 is essentially the width of a line, that is, it is almost infinitely narrow. Therefore, there will be a theoretically infinitely large pressure exerted on it by the force of flexible lip 35 being biased toward wall 41, and this will cause edge 28 to flatten into a rounded shape 28a (FIG. 6) where it contacts the cylinder wall so that it will provide a good seal with wall portion 41. However, it is believed that a satisfactory seal may also be obtained with an interference fit, even if a sharp corner 28 is not present.

The protuberances 29 and 34 are preferably located on flexible lips 30 and 35, respectively, because they are of greater diameter than internal cylinder wall 41. If they were located on central body portion 20, the possibility would exist that the pressure of wall 41 on the protuberance would decrease the diameter of bore 23 at the central body portion 20 so that piston rod 24 would bind.

The shock absorber 11 may contain any suitable hydraulic fluid therein. A piston head 42 is formed integrally with piston rod 24 and it has an outer cylindrical surface 43 which is located in contiguous relationship to internal cylindrical surface 44 of cylinder 11. A spring 45 has one end which bears against end wall 13 and the other end which bears against piston face 46 so as to bias piston rod 24 to the position shown in FIG. 1. When a force is applied to cap 47 on piston rod or shaft 24, piston 42 will be forced to the right against the bias of spring 45 and hydraulic fluid will be forced from chamber 47 into annular chamber 49 by flowing through a clearance space 50 between the outer surface 43 of the piston and internal cylinder surface 44. The fluid flowing past piston 42 will be received in accumulator 48 which is essentially an annular plastic body having cylindrical sides 51 and 52 each of which has a plurality of holes 53 circumferentially spaced therein. Piston rod 24 moves through bore 58 in accumulator 48, which is stationary because of a tight fit between its outer surfaces 68 and the internal wall 44 of the cylinder.

During movement of piston 42 to the right, ball check valve 54 will remain on its seat 55. When the force is removed from cap 47, spring 45 will expand and piston 42 will be forced to the left. At this time ball 54 will move off of its seat and against annular edge 56 of sleeve 57 in the end of piston 42. At this time any hydraulic fluid in chamber 49 will be able to pass into the chamber 47 by passing through slot 59 on the rear of piston 42, duct 60 in piston head 42, and bores 61 in piston head 42.

In FIG. 5 an alternate embodiment 10' is shown. It is an end cap which can be used to seal the end of a cylinder and which does not have a bore therein for receiving a shaft. In this embodiment the parts designated by primed numerals correspond to parts described above which are designated by unprimed numerals and therefore a further description is deemed unnecessary. The end cap 10' is identical in all respects to end cap 10 except for the bore 23 therein.

It can thus be seen that the improved end cap construction of the present invention is manifestly capable of achieving the above-enumerated objects and while preferred embodiments have been disclosed, it will be appreciated that the present invention is not limited thereto, but may be otherwise embodied within the scope of the following claims.

What is claimed is:

1. A combined locking and sealing end cap for an associated cylinder having a continuous annular internal surface comprising a plastic body having a central body portion and first and second annular end portions integral therewith on opposite ends thereof and outer surfaces on all of said portions, a first annular flexible lip extending outwardly from said central body portion at said first end portion, protuberance means on said outer surface of said first annular flexible lip for effecting locking engagement with said associated cylinder, a second annular flexible lip extending outwardly from said central body portion on the opposite side thereof from said first end portion, and second continuous annular protuberance means on said outer surface of said second annular flexible lip for effecting permanent continuous static sealing engagement with said continuous annular internal surface of said associated cylinder under the bias of said second annular flexible lip when said second annular flexible lip is in a flexed condition.

2. A combined locking and sealing end cap as set forth in claim 1 wherein said first protuberance means comprises barb means having smaller and larger diameter ends with said smaller diameter end being located further away from said central body portion than said larger diameter end.

3. A combined locking and sealing end cap as set forth in claim 2 wherein said second protuberance means is of larger diameter than said outer surface of said central body portion.

4. A combined locking and sealing end cap as set forth in claim 3 wherein said second protuberance means comprise an annular ridge.

5. A combined locking and sealing end cap as set forth in claim 1 including a bore extending through said central body portion for receiving a shaft.

6. A combined locking and sealing end cap as set forth in claim 5 including a third annular flexible lip extending outwardly from said central body portion and located within said first annular lip for effecting sealing with said shaft.

7. A combined locking and sealing end cap as set forth in claim 6 including a fourth annular flexible lip extending outwardly from said central body portion and located within said second annular lip for surrounding said shaft.

8. A combined locking and sealing end cap as set forth in claim 1 in combination with said associated cylinder, a continuation annular internal surface in said cylinder, groove means in said internal surface for receiving said first protuberance means in said locking engagement, said continuous annular internal surface of said cylinder including a portion spaced from said groove means, and said second protuberance means being in direct engagement with said portion of said continuous annular internal surface spaced from said groove means and being originally of larger diameter than said portion of said continuous annular internal surface with which it is in sealing engagement so as to provide an interference fit therewith, said second annular flexible lip being flexed as a result of said interference fit to maintain said second protuberance means biased into said permanent continuous static sealing engagement with said portion of said continuous annular internal surface.

9. A combined locking and sealing end cap as set forth in claim 8 wherein said groove means are of complementary mating shape to said first protuberance means.

10. A combined locking and sealing end cap as set forth in claim 8 wherein said first protuberance means comprises barb means having smaller and larger diameter ends with said smaller diameter end being located further away from said central body portion than said larger diameter end.

11. A combined locking and sealing end cap as set forth in claim 10 wherein said second protuberance means is of larger diameter than said outer surface of said central body portion.

12. A combined locking and sealing end cap as set forth in claim 11 wherein said second protuberance means comprises an annular ridge.

13. A combined locking and sealing end cap as set forth in claim 8 including a bore extending through said central body portion for receiving a shaft.

14. A combined locking and sealing end cap as set forth in claim 13 including a third annular flexible lip extending outwardly from said central body portion and located within said first annular lip for effecting sealing with said shaft.

15. A combined locking and sealing end cap as set forth in claim 14 including a fourth annular flexible lip extending outwardly from said central body portion and located within said second annular lip for surrounding said shaft.

16. A combined locking and sealing end cap as set forth in claim 8 wherein said central body portion provides a close fit with a second portion of said continuous annular internal cylindrical surface spaced from said continuous annular portion of said internal surface spaced from said groove means.

17. A combined locking and sealing end cap as set forth in claim 16 wherein said second protuberance means includes an annular edge facing said central body portion, said annular edge being substantially the width of a line so that it tends to flatten where it contacts said portion of said continuous annular internal cylindrical surface under the bias of said flexed second annular flexible lip.

18. A combined locking and sealing end cap as set forth in claim 16 wherein said second protuberance means includes an annular edge formed at the junction of an outside surface of said second protuberance means and a transverse side facing said central body portion, said annular edge being of relatively narrow width so that it tends to flatten where it contacts said portion of said continuous annular internal cylindrical surface under the bias of said second annular flexible lip.

19. A combined locking and sealing end cap as set forth in claim 8 wherein said portion of said continuous annular cylindrical surface spaced from said groove means with which said second protuberance means is in direct engagement is ungrooved.

20. A combined locking and sealing end cap as set forth in claim 8 wherein said portion of said continuous annular cylindrical surface spaced from said groove means with which said second protuberance means is in direct engagement is of substantially the same diameter as said central body portion.

* * * * *